United States Patent
Okada et al.

(10) Patent No.: US 7,099,867 B2
(45) Date of Patent: Aug. 29, 2006

(54) DYNAMIC DETERMINATION OF KEYWORD AND DEGREE OF IMPORTANCE THEREOF IN SYSTEM FOR TRANSMITTING AND RECEIVING MESSAGES

(75) Inventors: Sumiyo Okada, Kawasaki (JP); Masahiko Murakami, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 09/788,388

(22) Filed: Feb. 21, 2001

(65) Prior Publication Data
US 2002/0049868 A1 Apr. 25, 2002

(30) Foreign Application Priority Data
Jul. 28, 2000 (JP) ............................... 2000-228789

(51) Int. Cl.
*G06F 17/30* (2006.01)
(52) U.S. Cl. .................. 707/10; 707/6; 707/7; 709/207
(58) Field of Classification Search ............ 707/2, 707/4, 6, 7, 10; 704/10, 251; 709/207
See application file for complete search history.

(56) References Cited

U.S. PATENT DOCUMENTS 5,691,708 A * 11/1997 Batchelder et al. ......... 340/7.29
6,393,460 B1 * 5/2002 Gruen et al. ................ 709/204
6,473,753 B1 * 10/2002 Katariya et al. ............... 707/4
6,681,247 B1 * 1/2004 Payton .......................... 707/6

FOREIGN PATENT DOCUMENTS

| JP | 05-307569 | * | 11/1993 |
| JP | 1069482 | * | 3/1998 |
| JP | 10069482 | * | 3/1998 |
| JP | 11-242545 | * | 9/1999 |
| JP | 11242545 | * | 9/1999 |

OTHER PUBLICATIONS

Patent Abstracts of Japan of JP 11-242545 dated Sep. 7, 1999.
Patent Abstracts of Japan of JP 5-307569 dated Nov. 19, 1993.
Patent Abstracts of Japan of JP 10-069482 dated Mar. 10, 1998.

* cited by examiner

*Primary Examiner*—Leslie Wong
(74) *Attorney, Agent, or Firm*—Staas & Halsey LLP (57) ABSTRACT

A message transmitting and receiving apparatus includes a memory device for storing therein a keyword in an IRC and a degree of importance thereof, a unit for detecting an occurrence of a message, and a unit for extracting a keyword from a received message. An importance determining unit determines a degree of a keyword in a received message as stored in the memory device in accordance with whether or not a user of the apparatus has responded to the received message. Thus, keywords and degrees of importance thereof can be dynamically determined.

77 Claims, 7 Drawing Sheets

12:03 <user1> Is Ms. Okada available?
12:03 >user2< Can I help you?

FIG.5A

| Keyword | Importance |
|---|---|
| Okada | 1 |

12:06 <user1> http://www.fujitsu.co.jp
12:06 <user1> This is the homepage of Fujitsu.
12:06 <user1> I would like you to teach me. >user2
12:06 >user2< What?

FIG.5B

| Keyword | Importance |
|---|---|
| Okada | 1 |
| user2 | 1 |

12:12 <user1> Ms. Okada, can you tell me how to access CHOCOA version of Macintosh CHOCOA?
12:12 >user2< Select 'About CHOCOA' in Apple Menu.

FIG.5C

| Keyword | Importance | Keyword | Importance |
|---|---|---|---|
| Okada | 2 | CHOCOA | 2 |
| user2 | 1 | version | 1 |
| Macintosh | 1 | | |

12:17 <user1> I see. Thank you very much. >user2
12:17 >user2< You are welcome.

FIG.5D

| Keyword | Importance | Keyword | Importance |
|---|---|---|---|
| Okada | 2 | CHOCOA | 2 |
| user2 | 2 | version | 1 |
| Macintosh | 1 | | |

User's Calendar

January, 2000

| Sun | Tue | Wed | Thu | Fri | Sat |
|-----|-----|-----|-----|-----|-----|
|     |     |     |     |     |     |
|     |     |     |     |     |     |
|     |     |     |     |     |     |
|     |     |     |     |     |     |
|     |     |     |     |     |     |

Today's Schedule
January 12, 2000

10:00-11:00  Patent Meeting
15:30-16:30  Group Meeting
18:00-20:00  Badminton

Before January 12, 2000

| Keyword | Importance |
|---------|------------|
| version | 1 |

On January 12, 2000

| Keyword | Importance |
|---------|------------|
| version | 1 |
| patent | 1 |
| meeting | 2 |
| group | 1 |
| badminton | 1 |

FIG.6

```
13:19  <user3>  I will be in Yotsuya tomorrow.
13:19  <user4>  I see.
13:21  <user3>  In Tokyo, it's snowing.
13:25  <user5>  (Gogin to Tokyo may be senseless!)
13:25  <user4>  It'll be cold.
13:25  <user5>  (I don't want to put on snow shoes.)
13:26  >user2<  Mr.Matsuda is going to Tokyo!
```

Importance before 13:26

| Keyword | Importance |
|---|---|
| patent | 1 |
| meeting | 2 |
| group | 1 |
| badminton | 1 |

Importance Lowered at 13:26

| Keyword | Importance |
|---|---|
| patent | 0 |
| meeting | 1 |
| group | 0 |
| badminton | 0 |

Importance after 13:29

| Keyword | Importance |
|---|---|
| patent | 1 |
| meeting | 2 |
| group | 1 |
| badminton | 1 |

FIG.7

DYNAMIC DETERMINATION OF KEYWORD AND DEGREE OF IMPORTANCE THEREOF IN SYSTEM FOR TRANSMITTING AND RECEIVING MESSAGES

The present invention relates to determination of the degree of importance of a keyword for a received message in, for example, a chat system, and to indication of a received message depending on the degree of importance of the keyword.

BACKGROUND OF THE INVENTION

Usually, an Internet Relay Chat (IRC) client machine detects when a keyword, which a user has been registered previously through a keyboard, occurs in a received message, and notifies the user of the occurrence of the keyword. However, the received message, or the keyword preset by the user, may or may not be useful when the keyword occurs in the received message. Accordingly, it frequently occurs that the message including the keyword, the occurrence of which the user has been notified of, is not worth reading. Unless the useless registered keyword is deleted by the user, the user may be undesirably notified every time a message containing the keyword is received. In order to cope well with changes of the user's necessity, the user must frequently change his or her keyword.

Knowing that the keyword the user has previously registered through a keyboard may be in fact ineffective or may become ineffective to the user later, the inventors have recognized the need for providing facilities to automatically and dynamically register and delete a keyword. They have also recognized the need for reducing unnecessary or annoying notification to the user of reception of messages containing the ineffective keyword. Furthermore, the inventors have recognized the need for assigning different degrees of importance to keywords and notifying the user of reception of messages in a manner determined by the degree of importance given to the respective keywords.

Therefore, an object of the present invention is to provide dynamic registration and deletion of keywords, depending on a manner how a user responds to received messages or on the user's status.

Another object of the present invention is to provide assignment of different degrees of importance to keywords dependent on messages the user sends or on the user's status.

Still another object of the present invention is to provide dynamic change of the degrees of importance of the keywords, depending on a manner how a user responds to received messages or on the user's status.

A further object of the present invention is to provide a different audio and/or visual indication for each of received messages depending on the degree of importance given to the keyword associated with that received message.

Other objects of the present invention will be understood from the following description of the present invention.

SUMMARY OF THE INVENTION

According to one aspect of the present invention, an apparatus for transmitting and receiving messages includes a memory device for storing a keyword and its degree of importance, detector means for detecting occurrence of a message, extractor means for extracting a keyword from a received message, and keyword importance determiner means for determining the degree of importance to be given to the keyword.

The keyword importance determiner means may determine the degree of importance of the keyword stored in the memory device contained in a received message in accordance with whether or not the user has responded to the received message.

The keyword importance determiner means may determine the degree of importance of the keyword, in accordance with the number of occurrences of the keyword in a given range of received message data.

The keyword importance determiner means may determine the degree of importance of a keyword contained in a received message depending on the attribute or origin of the received message.

According to another aspect of the present invention, an apparatus for transmitting and receiving messages includes a memory device for storing a keyword and the importance of the keyword, detector means for detecting occurrence of a message, extractor means for extracting a keyword from a received message, and display means for providing a visual and/or audio indication of an occurrence of the extracted keyword in a manner determined by the degree of importance of the keyword.

According to still another aspect of the present invention, a program for transmitting and receiving messages, for use in an information processing apparatus, is stored on a storage medium. The program causes a processor to perform the step of detecting an occurrence of a message, the step of extracting a keyword from a received message, the step of determining the degree of importance to be given to the keyword, and the step of storing the keyword and its degree of importance in a memory device.

According to a further aspect of the present invention, a program for transmitting and receiving messages, for use in an information processing apparatus, is stored on a storage medium. The program causes a processor to perform the steps of storing a keyword and its degree of importance in a memory device, detecting an occurrence of a message, extracting a keyword from a received message, and providing a visual and/or audio indication of an occurrence of the extracted keyword in a manner determined by the degree of importance of the keyword.

According to another aspect of the present invention, a method for processing keywords is provided in a system for transmitting and receiving messages. The method includes the steps of detecting an occurrence of a message, extracting a keyword from a received message, determining the degree of importance to be given to the keyword, and storing in a memory device the keyword and its degree of importance.

According to a further aspect of the present invention, a method for processing keywords is provided in a system for transmitting and receiving messages. The method includes the steps of storing a keyword and its degree of importance in a memory device, detecting an occurrence of a message, extracting a keyword from a received message, and providing a visual and/or audio indication of an occurrence of the extracted keyword in a manner determined by the degree of importance of the keyword.

According to the present invention, a keyword can be dynamically registered or deleted depending on a manner how a user responds to received messages or on the user's status, can assign a degree of importance to the keyword, can dynamically change the degree of importance of the keyword, and can provide an audio and/or visual indication of a received message in a manner determined by the degree of importance of the keyword.

PREFERRED EMBODIMENT

Figure 1A:
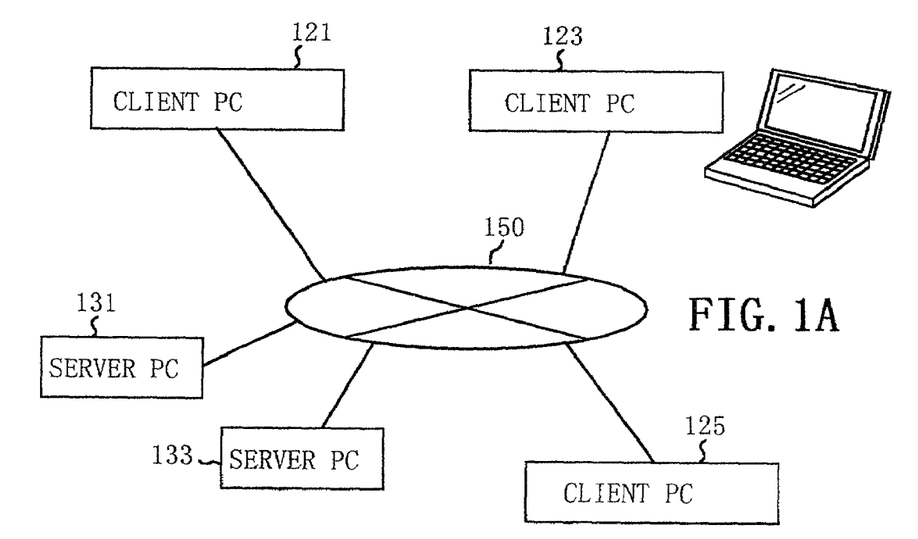
FIG. 1A schematically shows a chat system to which the present invention applies, including IRC client personal computers (PCs) and IRC server PCs interconnected via a network.
Figure 1B:
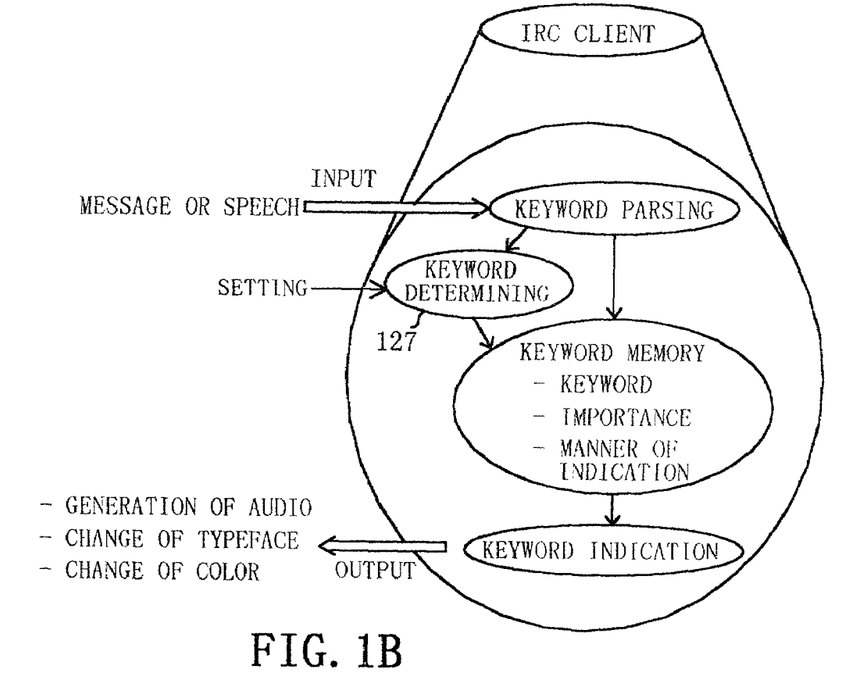
FIG. 1B schematically shows the operation of a client PC which parses a speech, determining a keyword and notifies an occurrence of a keyword in the speech.

FIGS. 1A and 1B illustrate a chat system including IRC client machines 121, 123 and 125 and IRC server machines 131 and 133, which are connected with each other via a network 150, such as the Internet, a telephone network and a local area network (LAN).

Figure 2:
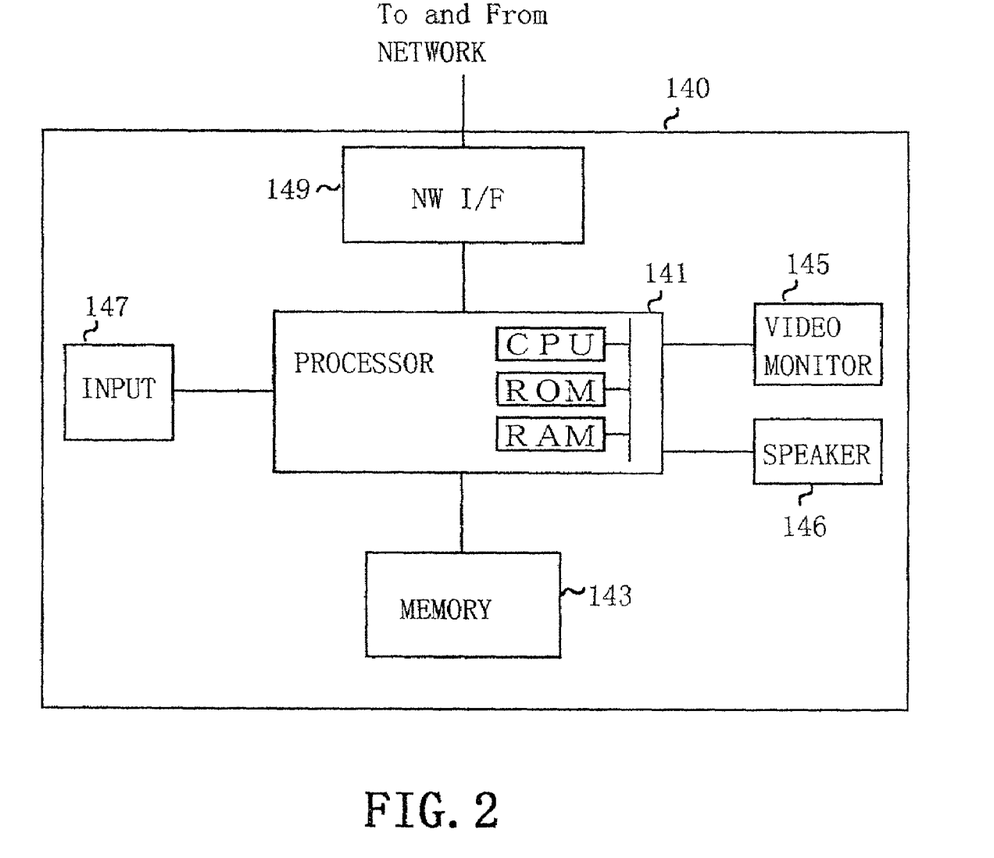
FIG. 2 shows arrangement of an IRC client PC.

FIG. 2 shows in detail the arrangement of an IRC client machine 140, which can be used as the client machine 121, 123 or 125 shown in FIG. 1A. The client machine 140 may be any type of information processing devices, such as a personal computer (PC), e.g. a desktop personal computer, a notebook sized personal computer, and a handheld personal computer, which includes a processor 141, a memory device 143, a network interface 149 which may have a dialer and a modem, a video monitor 145, a loudspeaker 146 or, alternatively, an earphone or the like, and an input device 147, e.g. a keyboard and a mouse. The server machines may also be an information processing machine, e.g. a personal computer.

In the following description, the IRC client, or client machines, 121–125 are described as information processing devices or personal computers loaded with an IRC application program so that the clients 121–125 can provide transmitting and receiving devices or systems. However, the clients may be transmitting and receiving devices which are arranged by hardware.

In an IRC system implemented by the device arrangement shown in FIGS. 1A, 1B and 2, the client PCs 121, 123 and 125 transmit and receive to and from each other messages or speeches on the same channel the users have set, via the server PCs 131 and 133 in a well known manner. The transmitted and received messages are displayed in real time on the video monitor or display in the order of occurrences as detected. Each server PC broadcasts a message from each of the client PCs connected to the same channel to the other client PCs in real time over the network 150.

Each of the client PCs 121, 123 and 125 operates in accordance with a chat client application in accordance with the present invention. Each client PC detects an occurrence of a message received from another chat client PC and an occurrence of a message transmitted by the user of that client PC. The client PC then parses or analyzes the messages received from other client PCs and dynamically determines and deletes keywords for itself, determines or assigns a degree of importance to each keyword, dynamically changes the degree of importance of each keyword, and provides the user with audio and/or visual indication relating to the received messages in a manner determined by the determined degree of importance of the keywords. The registration and deletion of a keyword and the determination of the degree of importance are made depending on responses or transmissions of messages by the users of that and other client PCs in response to messages containing that keyword.

According to the present invention, a keyword is given one of a plurality of degrees of importance. The degrees of importance may be expressed by, for example, numbers of from "0" to "20", or from "0" to "4". The degree of importance of each keyword can be determined automatically by each client PC and/or by the user of that client PC, and dynamically determined in accordance with the user's IRC messaging and the user's status or environment.

Basically, a higher degree of importance is given to a keyword to which the user frequently responds, and a lower degree of importance is given to a keyword to which the user less frequently responds. A keyword of a degree of importance lower than a threshold may be deleted.

A threshold regarding the degree of importance of keywords is preset by the user by modifying the default threshold value. A keyword of a degree of importance lower than the threshold value is not indicated, even if it appears in a message received from other client PCs. The threshold may be zero.

When a keyword occurs in a message from other client PC, the occurrence is indicated visually and/or audibly in any of different manners depending on the degree of importance of the keyword.

Figure 3:
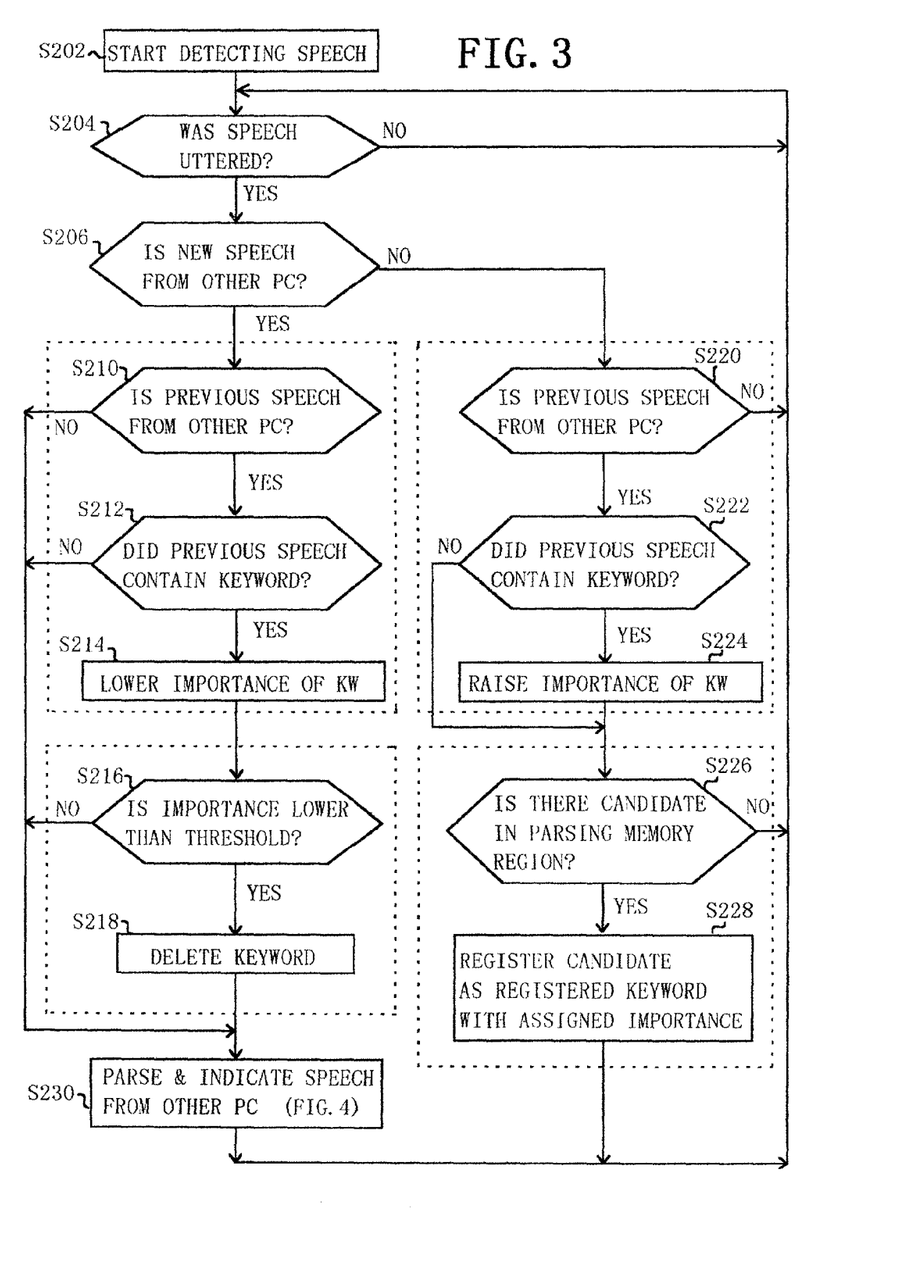
FIG. 3 is a flow chart according to which the client PC operates to detect an occurrence of a speech, to thereby dynamically change the degree of importance given to a keyword, dynamically register or delete a keyword, parse a received speech to extract a keyword and a candidate for a keyword (hereinafter referred to as a candidate keyword), and indicate the occurrence of the keyword.
Figure 4:
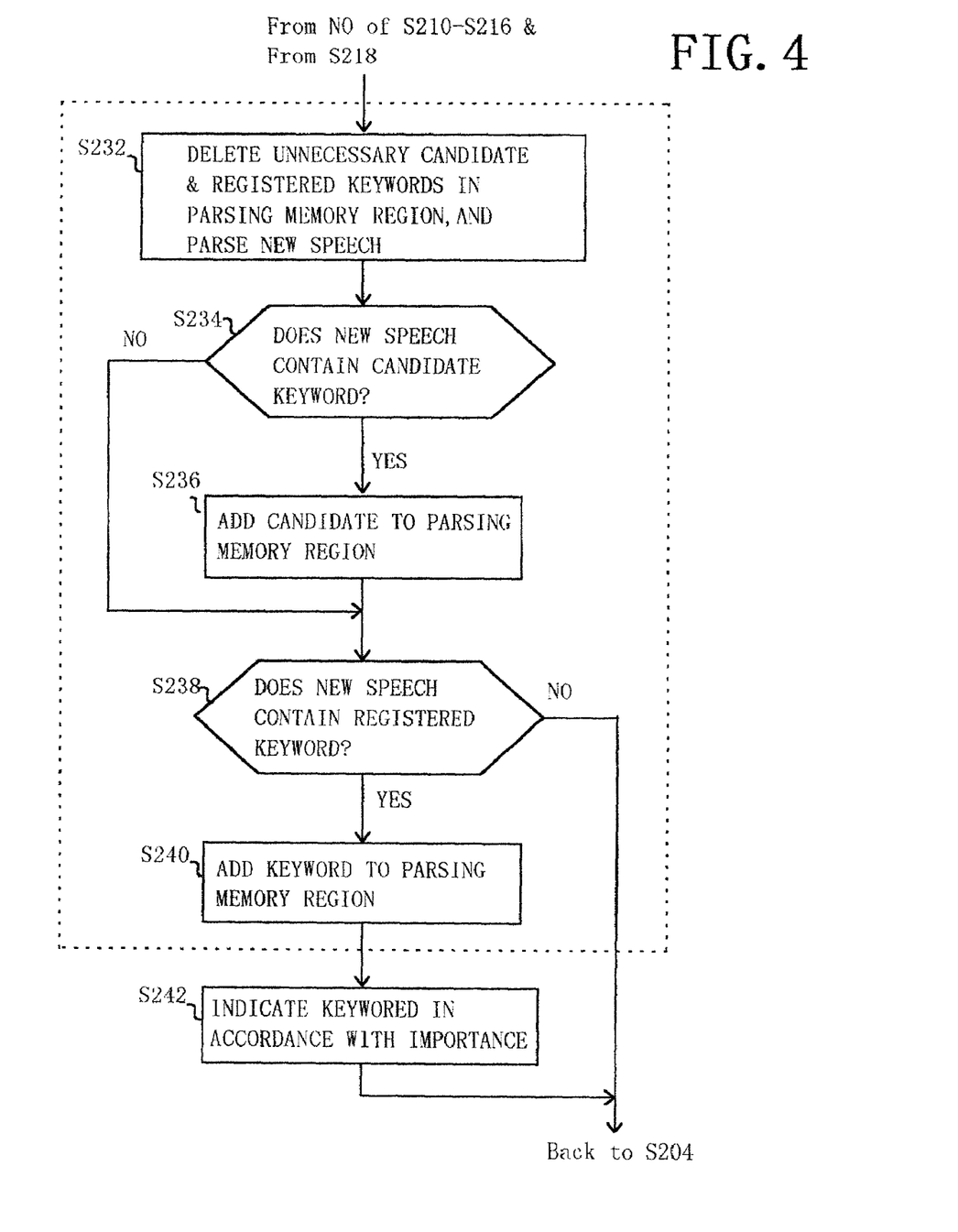
FIG. 4 is a flow chart showing in detail the step 230 shown in FIG. 3, in which a received speech is parsed for extraction of a keyword and a candidate keyword and indicating the occurrence of the keyword.

FIGS. 3 and 4 are flow charts of operations in accordance with the PC chat client application in an IRC client machine according to one embodiment of the present invention. It will be understood by those skilled in the art that the steps shown in FIGS. 3 and 4 can be implemented by hardware in a single IC or plural ICs possibly together with other circuit arrangement.

FIG. 3 shows a process for determining and managing keywords and, more particularly, a process for addition, change and deletion of stored data of a keyword and its degree of importance. The process includes Step 206, and Steps 210–228 for determining a keyword and its degree of importance. Steps 210–214 are provided for lowering the degree of importance of a keyword. Steps 220–224 are provided for raising the degree of importance of a keyword. Steps 216–218 are provided for deleting a keyword. Steps 226–228 are provided for adding a keyword.

The client PC operates in accordance with the IRC application, to start detecting an occurrence of a new speech or message received or transmitted in Step 202. In Step 204, the client PC determines whether or not there has been a new speech. As long as no new speech occurs, the procedure iteratively returns to Step 204 for detection of a new speech.

If it is determined in Step 204 that a new speech has occurred, then it is determined whether the detected new speech is from another client PC or not in Step 206. If the new speech is from another client PC, the procedure advances to Step 210. If, on the other hand, it is determined that the new speech is not from another client PC, that is, the new speech is of the subject client PC, the procedure advances to Step 220. Steps 210–214 and Steps 220–224 are for altering the degree of importance of a keyword. Optionally, in Steps 204–228 and in Step 230 which is illustrated in greater detail in FIG. 4, if a speech in parentheses "( )" (a speech like the one shown in lines 4 and 6 in FIG. 7) occurs, such speech may be ignored as if it did not occur at all since such speech is frequently unimportant.

If the new speech is uttered by other client, then the client PC determines in Step 210 as to whether the previous speech was from other client. If the previous speech is not from other client, i.e. if the previous speech is uttered by the subject client itself, the procedure advances to Step 230. On the other hand, if the previous speech was from other client, then it is determined whether or not the previous speech contained the keyword or registered keyword, in Step 212. If the previous speech did not contain the keyword, the procedure advances to Step 230. If the previous speech contained the keyword, the degree of importance of the keyword is lowered by one degree in Step 214 because it is considered that the user of the subject client machine did not utter a speech in response to the keyword. Then, the procedure advances to Step 216.

Steps 216 and 218 are steps for deleting a keyword. In Step 216 following Step 214, it is determined whether or not the degree of importance of the keyword has been lowered below a given threshold (e.g. 1 or 2). If the degree of importance has not been lowered below the threshold value, the procedure advances to Step 230. If the degree of importance has become lower than the threshold value, the keyword is deleted in Step 218. For example, when the degree of importance of the keyword becomes zero (0), the keyword is deleted. Alternatively, the threshold value may be set to be zero (0), while permitting the degree of importance to become −1, and the keyword of which the degree of importance has become −1 is deleted. After Step 218, the procedure advances to Step 230.

In Step 230, a client PC, for example, the client PC 125 shown in FIG. 1, parses a speech or message uttered by another person or client PC, stores a keyword, its degree of importance and a manner in which the keyword should be indicated or notified corresponding to the degree of importance of that keyword, and indicates the keyword to the user of the client PC 125, which are illustrated in FIG. 1B. As described above and will be described later, the degree of importance of the keyword is determined in Steps 210–228 of FIG. 3 which are performed in a keyword and importance determining process or determiner 127 of FIG. 1B. The details of Step 230 are shown in FIG. 4.

Steps 232–240 are provided for parsing speeches uttered by other persons. If a new candidate keyword is present in the new received speech or message, the candidate keyword is additionally and temporally held in a "parsing memory region" of the memory device as a candidate keyword, and if a registered keyword is contained in the new speech, it is additionally and temporally stored in the parsing memory region as a detected registered keyword. Then, in Step 242, the presence of the registered keyword which has occurred in another person's speech is indicated or notified in Step 242.

In Step 232 shown in FIG. 4, data relating to keywords of which the presence in messages need not be indicated is deleted from the parsing memory region, and, also, data relating to candidate keywords outside a predetermined range is deleted, retaining candidate keywords within the predetermined range. Thereafter, parsing of the new received speech is done.

The predetermined range is a range over one or plural consecutive received speeches occurring not before the last speech uttered by the user of the subject client PC, e.g. the client PC 125, that are counted or measured back from the current time, i.e. the time at which Step 232 or 206 is executed. The received message within the predetermined range may be a single new speech or last plural speeches, or may be last one or plural lines, plural words or characters, or it may be received speech data within a predetermined time period back from the current time.

Additionally, the predetermined range may be within a predetermined number of speeches of the client who uttered the new speech. In this case, candidate and registered keywords from other clients than the client who uttered the new speech are deleted from the parsing memory region. In other words, if the client who uttered the new speech had uttered plural speeches, only candidate and registered keywords occurring in a plurality of successive speeches of that client may be retained in the parsing memory region in Step 240 as will be described later. The above-described various conditions may be employed singly or in combination.

Unnecessary registered keywords in the parsing memory region to be deleted in Step 232 may be all the registered keywords in the parsing memory region. In other words, the condition (or predetermined speech range) based on which registered keywords are deleted and the condition based on which candidate keywords are deleted can be different.

The "previous" message containing a keyword of which the degree of importance is to be lowered in Step 214 in FIG. 3 may be a previous message outside the predetermined range, which does not meet the condition described above with reference to the candidate keyword. It should be noted that the conditions for the registered keywords and the conditions for the candidate keywords can be set independently.

Alternatively, unnecessary keywords to be deleted from the parsing memory region relevant to Step 232 in FIG. 4 may be registered keywords in the parsing memory region which have become not to meet the predetermined condition or have gone outside the predetermined range, as described above with respect to candidate keywords. For example, for last three speeches at the maximum which have been received from the same client within two minutes back from the detection of the last or new received speech, keywords only in these three speeches may be left in the parsing memory region.

In Step 234 following Step 232, whether or not the new speech contains a word, which can be a candidate for a candidate keyword, i.e. a new candidate keyword, is determined on the basis of the parsing made in Step 232. Possible candidate keywords are selected by the user. For example, candidate keywords may be selected from an existing dictionary with words added by the user. They may be only nouns including proper nouns, nouns and verbs, or nouns, verbs, words of another part of speech, e.g. adjectives, and symbols contained in such a dictionary.

If the new speech does not contain a new candidate keyword, Step 238 is executed. If the new speech contains a new candidate keyword, Steps 236 is executed for holding the candidate keyword in the parsing memory region, and then Step 238 is executed.

In Step 238, whether or not the new speech contains a registered keyword is determined on the basis of the above-described parsing. If the new speech does not contain any registered keyword, the procedure returns to Step 204 of FIG. 3 for detecting an occurrence of a next new speech.

On the other hand, if it has been determined in Step 238 that the new speech contains a registered keyword, that registered keyword is held in the parsing memory region in Step 240, and then the presence of the keyword held in the parsing memory region is indicated visually and/or acoustically in a manner corresponding to the degree of importance of that keyword.

As stated previously, the registered keywords have been given one of a plurality of degrees of importance, e.g. one of degrees "0"–"20" or "0"–"5". The user can set a threshold value for the degree of importance of registered keywords by changing a default threshold value, e.g. "1" or "2". An occurrence in another person's speech of a keyword having a degree of importance lower than the threshold value is not indicated. When a keyword having a degree of importance higher than the threshold occurs in another person's speech or when such a keyword is held in the parsing memory region, the keyword may be visually displayed, in accordance with the degree of importance, in any of different colors and/or by different types of characters, or an occurrence of such keyword is audibly indicated at any different volume and/or in tone. Alternatively, the keyword may be manifested in synthetic voice. Alternatively, the manner in which an IRC window is displayed may be modified to indicate the occurrence of the keyword.

Now, the present invention is described by means of example in which the importance of keywords is graded into twenty-one degrees of from "0" to "20".

For example, if a keyword having a degree of importance in a range of from "16" to "20" occurs in a speech from other client machine, the keyword is displayed in red in an IRC window, and, at the same time, a big is generated. Alternatively, the keyword may be pronounced, using a synthetic voice. If a keyword having a degree of importance in a range of from "11" to "15" occurs in a speech from other client, it may be displayed in green in the IRC window, and a beep of a moderate magnitude or a synthetic voice representing the keyword may be generated. When a keyword having a degree of importance in a range of from "6" to "10" occurs in a speech from other client, it may be displayed in, for example, yellow in the IRC window, and a small beep or a synthetic voice pronouncing the keyword may be generated. When a keyword having a degree of importance in a range of from "1" to "5" occurs in a speech from other client machine, the keyword is displayed in Gothic in the IRC window, and no sound is generated. In this case, if the IRC window is not being displayed, a small beep or a synthetic voice pronouncing the keyword is generated to invite the user to make the IRC window displayed, and, then, the keyword is displayed in Gothic on the video monitor. Since a beep is generated, the user can know the occurrence of the keyword even when the IRC window is displayed in the form of an icon or is hidden behind in the display. If plural keywords having different degrees of importance occur in a single received speech, the beep for the keyword having the highest degree of importance or a synthetic voice for such keyword is generated. Also, it may be arranged such that when a keyword having a degree of importance in a range of from "1" to "20", the IRC window displayed in the form of an icon or in a reduced size may be displayed, being enlarged, or it may be manifested on the video monitor screen.

Returning to FIG. 3, if Step 206 determines that the new speech is not one which was received from another client, Step 220 is executed to determine whether or not the previous speech was from other client. If the previous speech was not from other client, i.e. if the previous speech was one the subject client transmitted, the procedure returns to Step 204. If the previous speech was uttered by other client, Step 222 is executed to determine whether or not the previous speech contained a registered keyword. If the previous speech did not contain a keyword, Step 226 is executed. If a keyword was contained in the previous speech, it is supposed that the user of the subject client responded to the previous speech by transmitting a speech. Then, in Step 224, the degree of importance of the registered keyword stored in a registered keyword memory region in the memory device, corresponding to the keyword in the previous speech, is raised by a magnitude corresponding to the number of occurrences of the keyword in the previous speech held in the parsing memory region. Then, Step 226 is executed. The previous speech containing a keyword of which the degree of importance is to be raised in Step 224 may be a single received speech or message, or may be previous message data within the predetermined range meeting the conditions described previously with respect to Step 232 in FIG. 4. For example, the degree of importance of a registered keyword as stored in the registered keyword memory region may be raised by a magnitude corresponding to the number of occurrences of the registered keyword in last three consecutive speeches at the maximum of the same client received within two minutes back from the detection of the last received speech.

Steps 226 and 228 are for keyword registering steps. In Step 226, it is determined whether or not there is any candidate keyword in the parsing memory region. If there is no candidate keyword held in the parsing memory region, the procedure returns to Step 204. When there is a candidate keyword in the parsing memory region, it is supposed that the user responded to the candidate keyword by sending a speech, and, accordingly, the candidate keyword is given a degree of importance, for example, "1" or "2", as determined based on the number of the occurrences of the candidate keyword and registered as a normal keyword in the registered keyword memory region in the memory device. The user can determine what degree of importance a candidate keyword is given first. If the degree of importance given to a particular keyword first time is set to "2" or higher, that keyword is not deleted even if the user of the subject client does not respond to that keyword once or more times corresponding to the degree of importance set.

After that, the procedure returns to Step 204 and continues to detect an occurrence of a new speech.

In Step 236 in the flow shown in FIG. 4, a candidate keyword may be stored in the registered keyword region together with a degree of importance of "0" rather than the parsing memory region. If a keyword with a degree of importance of "0" occurs in a received message, the occurrence is not notified to the user in Step 242, and, if a message sent by the user of the subject client does not follow the received message containing that keyword, i.e. if other person's speech follows the received message containing that keyword, the keyword is deleted in Step 214. On the other hand, if the user immediately has responded to the received message with that keyword registered with a degree of importance of "0", the degree of importance of that keyword is raised to "1" in Steps 222 and 224. In this case, Steps 226 and 228 are unnecessary.

FIGS. 5A through 5D show some examples of speeches or messages processed in accordance with the flow charts shown in FIGS. 3 and 4. In these examples, the predetermined condition or range adopted in Step 232 is a received new single speech, and keywords and candidate keywords in the speeches received before that new speech from other clients are deleted in the parsing memory region. Also, in these examples, words to be extracted as candidate keywords are only nouns including proper nouns registered by the user.

In each of FIGS. 5A through 5D, speeches shown in an area between two bold vertical lines are speeches displayed in an IRC window on the display of an IRC client machine. Speeches are shown divided into FIGS. 5A through 5D for ease of explanation. Actually, however, they are displayed consecutively. Also, broken underlines indicate that the underlined words are candidate keywords extracted from the speeches. These underlines are added just for ease of explanation of the examples, and they are not actually displayed. Characters in Gothic represent detected registered keywords which have occurred in received speeches. In stead of displaying in Gothic, registered keywords may be displayed in color.

Figure 5A:
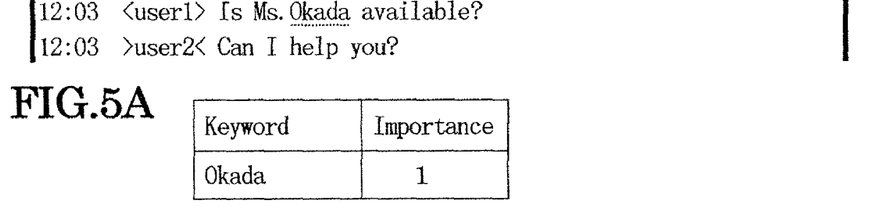
FIGS. 5A, 5B, 5C and 5D show some examples of how to process keywords in accordance with the present invention.

Referring to FIG. 5A, an IRC client (hereinafter referred to as a subject IRC client) detects, in Step 204 in the flow chart shown in FIG. 3, that a new speech or message has been received from another IRC client at 12:03, and then displays data relating to the received speech on the display screen. The displayed data includes the nickname, "user1" of the user of the other IRC client from which the speech was received, placed between brackets. (Nicknames of users of other clients are placed between brackets "<>".) A speech, "Is Ms. Okada available?", follows the bracketed nickname <user1>. It is determined in Step 206 that this speech is received from other client, and hence the procedure advances to Step 210. It is determined in Step 210 that no previous speech exists, and hence the procedure advances to Step 230, or Step 232 in the flow chart shown in FIG. 4. In Step 232, data left in the parsing memory region is deleted first, and then the new speech is parsed. In Step 234, it is determined that the new speech contains a new candidate keyword "Okada", which is then stored in the parsing memory region in Step 236. In Step 238, it is determined that the new speech does not contain any registered keywords, and the procedure returns to Step 204.

Then, in Step 204, the subject IRC client detects that a new speech was transmitted by the user of the subject client at 12:03. Data relating to this new speech is displayed. The displayed data includes the nickname "user2" of the user of the subject client placed between reversed brackets "><". The bracketed nickname >user2< is followed by the speech "Can I help you?". In Step 206, it is determined that this speech is not one from other client, and hence the procedure advances to Step 220. It is determined in Step 220 that the previous speech was from other user, and hence the procedure advances to 222. It is determined that in Step 222 that no registered keyword was contained in the previous message, and hence the procedure advances to Step 226. It is determined that in Step 226 that the candidate keyword "Okada" in the previous speech is stored in the parsing memory region, and hence Step 228 is executed to store the candidate keyword "Okada" for registration as a keyword with a degree of importance of "1", in the registered keyword memory region, as shown in the form of a table in FIG. 5A below the speeches. Then, the procedure returns to Step 204.

Figure 5B:
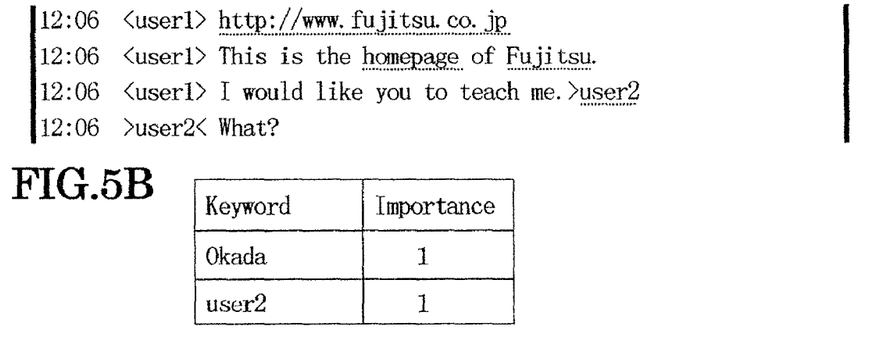

Then, as shown in FIG. 5B, the subject client detects a new speech and displays it in the form "12:06 <user1> http//www.fujitsu.co.jp". The procedure advances from Step 204 through Step 206 to Step 210. It is determined that in Step 210 that the previous speech was not from other client, and hence the procedure advances to Step 230, which is illustrated in detail in FIG. 4. In Step 232 shown in FIG. 4, the previous data stored in the parsing memory region is deleted, and then the new speech is parsed. In Step 234, it is determined that the new speech contains a new candidate keyword, "http//www.fujitsu.co.jp", and, therefore, Step 236 is executed to store the new candidate keyword in the parsing memory region. Then, in Step 238, it is determined that the new speech does not contain any registered keyword, and the procedure returns to Step 204.

Then, a new speech received at 12:06 is displayed as "12:06 <user1> This is the homepage of Fujitsu.". The procedure advances from Step 204 shown in FIG. 3 through Step 206 to Step 210. It is determined in Step 210 that the previous speech is from other client, and hence the procedure advances to Step 212. It is determined in Step 212 that the previous speech did not contain any registered keyword, and hence the procedure advances to Step 232 shown in FIG. 4.

In Step 232, the previous data in the parsing memory region is deleted, and the new speech is parsed. It is determined in Step 234 that the new speech contains new candidate keywords, "Fujitsu" and "homepage". These two candidate keywords are then stored in the parsing memory region in Step 236. In Step 238 it is determined that the new speech contains no registered keyword, and hence the procedure returns to Step 204.

Then, a new received speech is displayed as, "12:06 <user1> I would like you to teach me>user2". This new speech is processed in a manner similar to the one described above, and a candidate keyword "user2" is stored in the parsing memory region in Step 234.

Then, a speech which is uttered by the user of the subject client is displayed as, "12:06 >user2< What?", and transmitted. The procedure advances from Step 204 through Step 206 to Step 220. It is determined in Step 220 that the previous speech was from other client, and hence the procedure advances to Step 222. It is determined in Step 222 that the previous speech does not contain any registered keyword, and hence the procedure advances to Step 226. It is determined in Step 226 that there is a candidate keyword stored in the parsing memory region, and hence, in Step 228, the candidate keyword, "user2", is given a degree of importance of "1" and registered as a registered keyword, as shown in the form of a table in FIG. 5B below the speeches. Then, the procedure returns to Step 204.

Figure 5C:
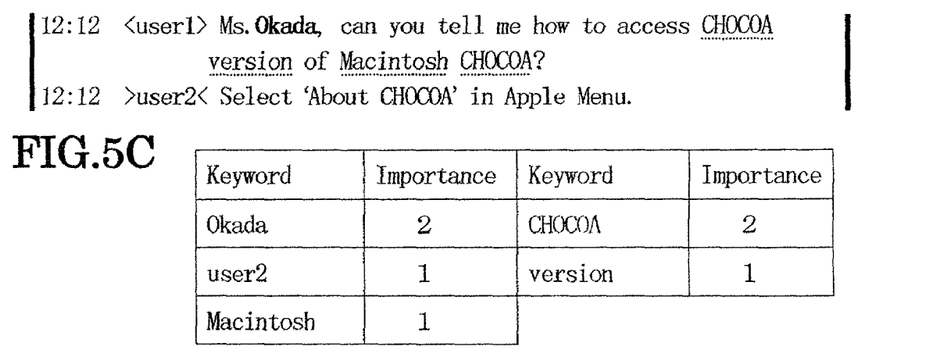

After that, as shown in FIG. 5C, a new speech is received and displayed as, "12:12 <user1> Ms. Okada, can you tell me how to see the version of CHOCOA through the Macintosh CHOCOA?". The procedure advances from Step 204 in FIG. 3 through Step 206 to Step 210. In Step 210, it is determined that the previous speech is not from other client, so that the procedure advances to Step 230 of which detail is shown in FIG. 4. In Step 232, the previous data in the parsing memory region is deleted, and the new speech is parsed. In Step 234, it is determined that the new speech contains candidate keywords "Macintosh", "CHOCOA" (two occurrences), and "version". Accordingly, these candidate keywords are added to the parsing memory region in Step 236, and the procedure advances to Step 238. It is determined in Step 238 that the new speech contains a registered keyword, "Okada", and the procedure advances to Step 240, where the keyword "Okada" is stored in the parsing memory region. In Step 242, the keyword "Okada" is caused to be indicated in Gothic, for a keyword of a degree of importance of "1", in the displayed new speech in the IRC window, and, at the same time, a small beep for a keyword of a degree of importance of "1" is generated by a loudspeaker associated with the PC.

The user of the subject client generates a speech, which is displayed as, "12:12 >user2< Select 'About CHOCOA' in Apple Menu". Then, the procedure advances from Step 204 through Step 206 to Step 220. It is determined in Step 220 that the previous speech is from other client, the procedure advances to Step 222, and, then, to Step 224 since the previous speech contained a registered keyword, namely, "Okada", having a degree of importance of "1". In Step 224, the degree of importance of "1" of the registered keyword "Okada" in the parsing memory region is increased by "1" to "2". Then, Step 226 is executed in the same manner as described previously, to give a degree of importance of "1" to the candidate keyword "Macintosh" and stored in the registered keyword region as a registered keyword. Also, a degree of importance of "2" is given to the candidate keyword "CHOCOA" which occurred twice in the previous speech, and the candidate keyword "CHOCOA" is registered as a registered keyword. Similarly, the candidate keyword "version" is given a degree of importance of "1" and is registered as a registered keyword. Then, the procedure returns to Step 204.

Figure 5D:
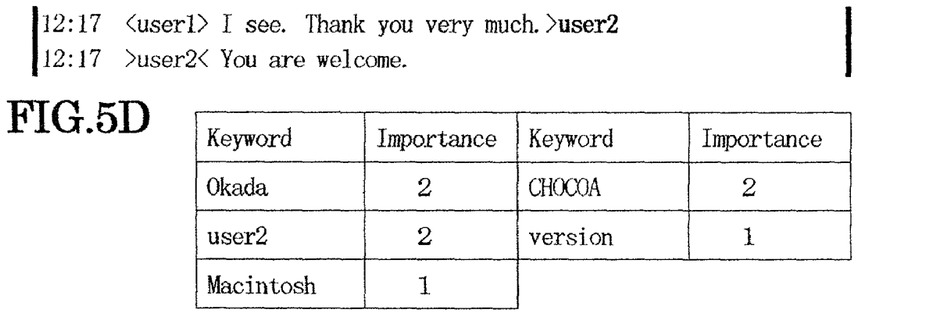

Then, a new speech from "user1" is received and displayed as, "12:17 <user1> I see. Thank you very much. >user2", as shown in FIG. 5D. The procedure advances from Step 204 in the flow shown in FIG. 3 through Step 206 to Step 210. In Step 210, it is determined that the previous speech is not of other client, and the procedure advances to Step 230. In Step 232 in the flow chart shown in FIG. 4, the previous data including the candidate keywords and the registered keywords held in the parsing memory region is deleted, and the received new speech is parsed. In Step 234, it is determined that the new speech does not contain a candidate keyword, and Step 238 is executed. It is determined in Step 238 that the new speech contains the registered keyword, "user2", and hence the procedure advances to Step 240. In Step 240, the keyword "user2" is added to the parsing memory region. In Step 242, the keyword "user2" is caused to be indicated in Gothic for a keyword of a degree of importance of "1", and a small beep for a keyword of a degree of importance of "1" is emitted from the loudspeaker. Then, the procedure returns to Step 204.

Then, a speech of the subject client is displayed as, "12:07 >user2< You are welcome", and transmitted. The procedure advances from Step 204 in FIG. 3 through Step 206 to Step 220. In Step 220, it is determined that the previous speech was received from other client, and the procedure advances to Step 222. It is determined in Step 222 that the previous speech contained the keyword "user2", and hence the procedure advances to Step 224, where the degree of importance of the keyword "user2" in the registered keyword memory region is increased by "1" to "2", as shown in the form of a table below the speeches in FIG. 5D. Then, the procedure returns to Step 204 through Step 226.

Figure 6:
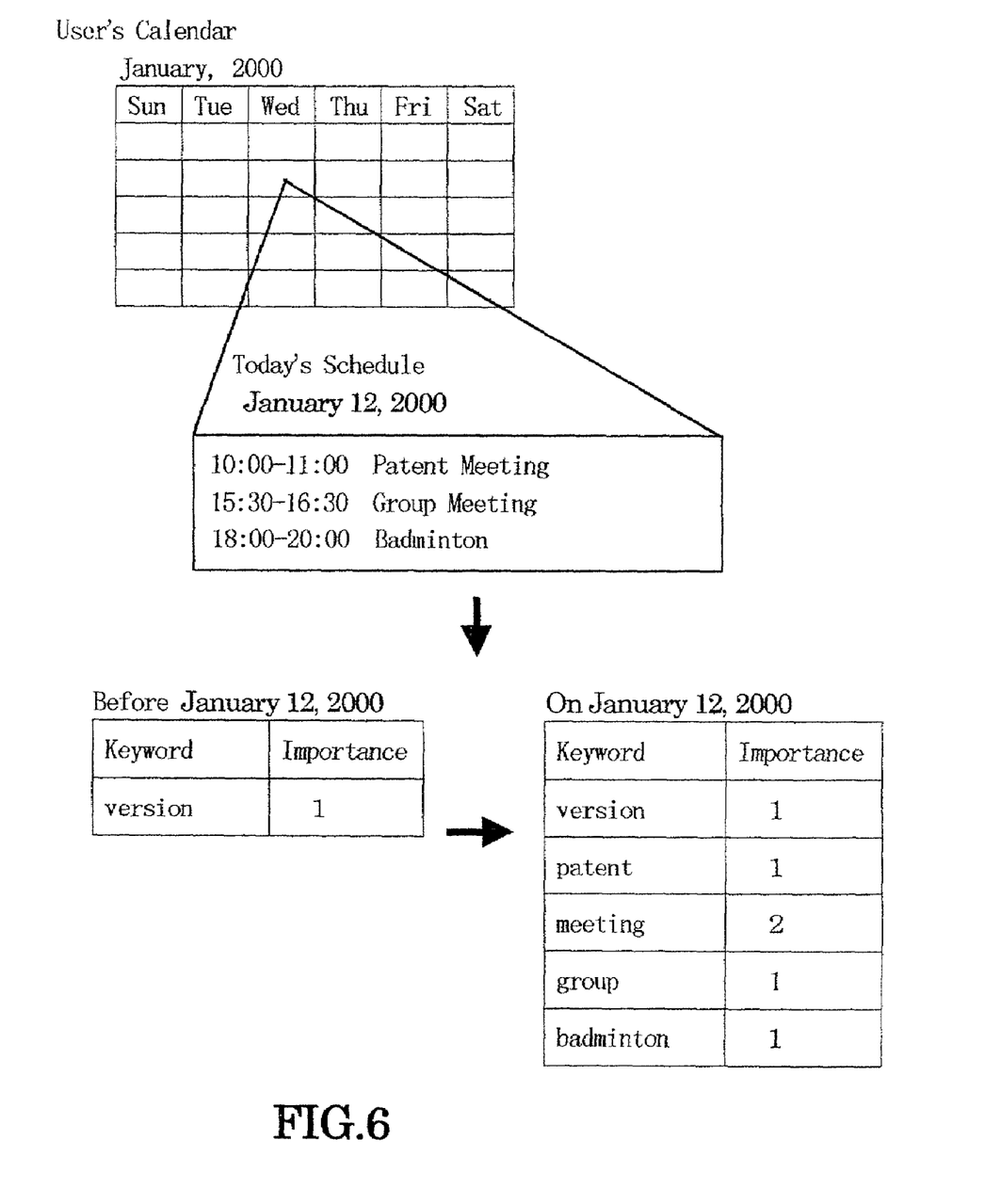
FIG. 6 shows another example of how to process keywords in accordance with the present invention.

FIG. 6 shows another arrangement useable in the present invention. When activated, a client PC operates in accordance with the IRC application to read a calendar in the PC for the user and parse a phrase or sentence used in each item of the schedule of a current day to extract particular words. Words which have not yet been registered as keywords are given, in the keyword and importance determining process 127 of FIG. 1B, a degree of importance in accordance with the number of occurrences in the schedule for that day and stored in a keyword memory region as keywords effective only for that day. Words which have been already registered as keywords have their degrees of importance raised in accordance with the number of occurrences. The raised degrees of importance are effectively only for that day.

In FIG. 6, the schedule of the user for Jan. 12, 2000 is shown in detail as an example. It is assumed that only a word "version" has been registered as a keyword with a degree of importance of "1". Words "patent", "meeting", "group" and "badminton" are registered as keywords with degrees of importance of "1", "2", "2" and "1", respectively, effective only for Jan. 12, 2000. When any of these registered keywords occurs in the chat, the words and speeches containing the words are processed in the manner described previously.

Figure 7:
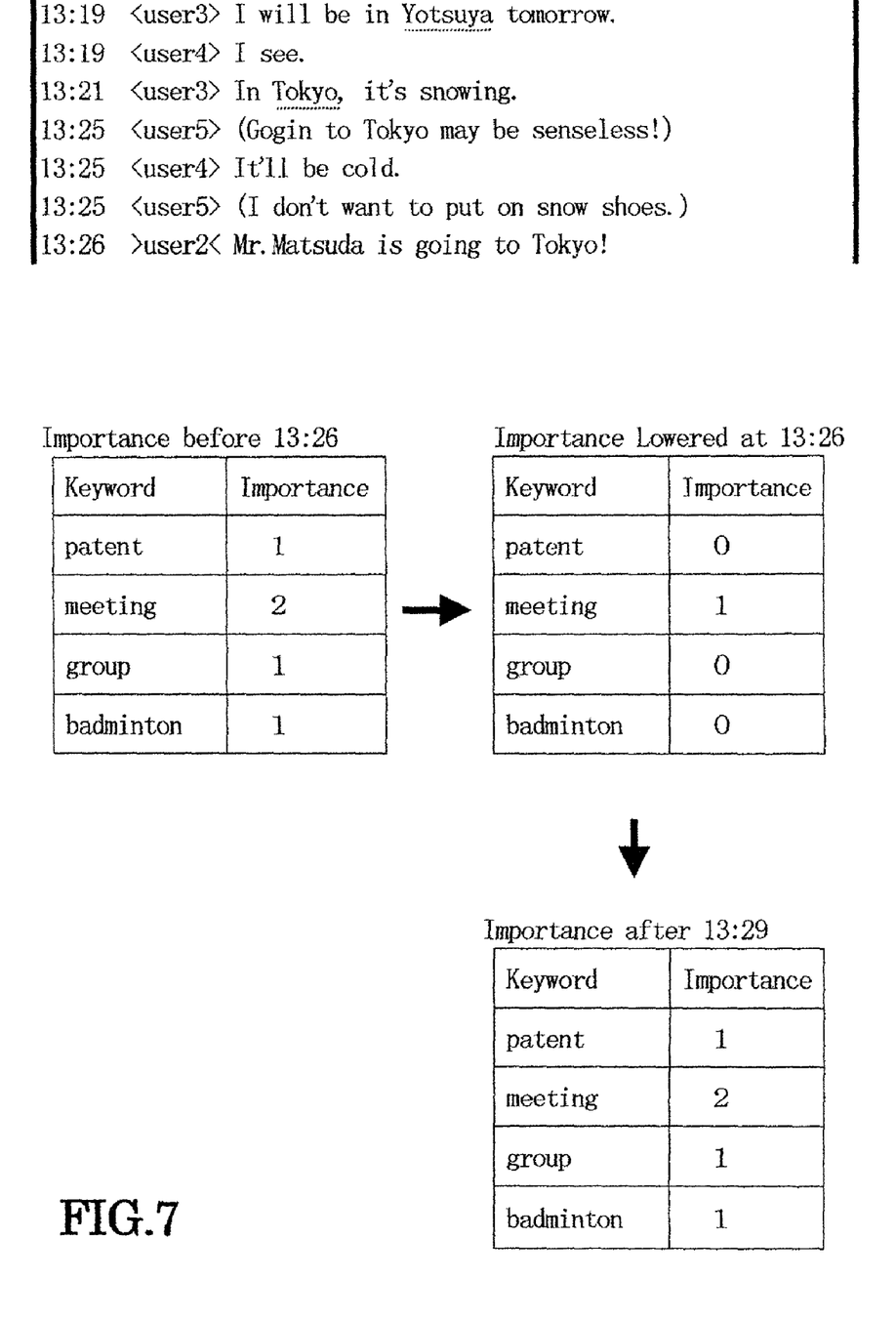
FIG. 7 shows still another example of how to process keywords in accordance with the present invention.

FIG. 7 illustrates another arrangement useable in the present invention. According to this embodiment, the client PC operates, in the keyword determining process 127 of FIG. 1B, to lower the degrees of importance of all the keywords by a degree of, for example, "1" for a predetermined period, e.g. ten seconds or three minutes, after the user of that client PC utters a speech. The occurrence of the keywords is indicated or notified in a manner corresponding to the lowered degrees of importance. The degree of importance, in this case, may be lowered because it is highly likely that the user is seeing the IRC window after he or she utters a speech, and it is relatively less necessary to indicate or notify the occurrence of keywords to the user.

Referring to the example shown in FIG. 7, the degrees of importance of all the keywords, "patent", "meeting", "group" and "badminton", are lowered by a degree of "1" for a period of three minutes, from 13:26 to 13:29, after the user uttered a speech at 13:26, "13:26 >user2< Mr. Matsuda is going to Tokyo!". At 13:29, the degrees of importance are restored by raising them by "1".

It is highly likely that the user, when he or she is using the input device 147 (FIG. 2), e.g. the keyboard or the mouse, is seeing the display screen on the IRC client. Accordingly, the IRC application, in the keyword determining process 127 of FIG. 1B, may be so arranged as to lower the degrees of importance of all the keywords by a predetermined degree, e.g. "1", for a time period during which the user is operating the input device 147 and for a short time period after it. The occurrence of the keywords are indicated or notified to the user in a manner corresponding to the lowered degrees of importance.

According to another feature of the present invention, when a keyword registered in the keyword memory region occurs more than a predetermined number in a predetermined time period, the degree of importance of that keyword is lowered by a predetermined degree, in the keyword determining process 127 of FIG. 1B. The predetermined number of occurrences can be set by the user. For example, when a keyword occurs more than fifty (50) times on a day, from that time or the next day on, the degree of importance of "20" of the keyword may be lowered to, for example, "11" at the maximum. This arrangement is useful because frequent outstanding indications or notifications of frequent occurrences of a keyword with a high degree of importance may be nuisance, and it is meaningless to give a high degree of importance.

In contrast, a keyword which does not occur for a predetermined time period of, for example, ten (10) days, may be relatively less importance, the degree of importance of that keyword may be lowered by a predetermined degree of, for example, "1", in the keyword determining process 127. For example, if a keyword having a degree of importance of "5" does not occur for ten days, the degree of importance may be lowered to "4", and if it continues not to occur after that, the degree of importance is lowered to "0" fifty days later, and the keyword is deleted.

The degrees of importance of IRC keywords may be set in a client PC of a particular user, in the keyword determining process 127 of FIG. 1B, independently for each IRC network, for each IRC channel and/or for each of other client PCs with which the particular client PC communicates. In other words, the degree of importance of keywords may be set in different ways, depending on IRC networks or servers through which the speech containing that keyword is routed to the client PC.

For example, if a speech is received through a LAN IRC server, the degree of importance of a keyword in that speech is raised by, for example, "3" when it is first registered, with the highest degree of importance set to "20", whereas the highest degree of importance may be set to "5" if the speech is received through an external Internet IRC server.

The degree of importance of keywords may be set, in the keyword determining process 127, in different manners, depending on IRC channels. For example, the degree of importance for keywords for an IRC channel relating to the project most important to the user may be raised by, for example, "5", so that when a keyword is first registered, a degree of importance of "6" is given to the keyword.

The degree of importance of keywords may be set, in the keyword determining process 127, in different manners, depending on other clients which the subject client communicates with. For example, keywords in a speech from the client of a user with whom the user of the subject client PC is handling the most importance matter may be raised by, for example, "5".

The IRC application in the keyword determining process 127 of FIG. 1B may be so arranged that the user may raise the degree of importance of predetermined keywords for a predetermined time period. For example, the user may preset the IRC client PC in such a manner as to raise a keyword "2001" for a time period of from Dec. 1, 2000 to Jan. 31, 2001.

When a particular keyword designated by the user is registered when it first occurs, or when such designated particular keyword is registered prior to its occurrence, the degree of importance of that keyword may be fixed, in the keyword determining process 127, to a predetermined value, e.g. "5", or raised by, for example, "1". The highest degree of importance of that particular keyword may be set lower in the keyword determining process 127. A keyword selected by the user may be prevented from being registered, in the keyword determining process 127. Also, a selected particular keyword which has been registered may be deleted in the keyword determining process 127.

For example, a particular keyword selected by the user, when it is registered first time, may be given a degree of importance of "2" so that it may not be deleted even if the user does not respond to a speech containing the particular keyword once. For example, when the user expects to receive a very important speech containing a particular keyword on a certain day, he or she may register beforehand that particular keyword with a highest degree of importance of, for example, "20".

The above-described embodiments are only typical examples, and their modifications and variations are obvious to people skilled in the art. It is evident that any people in the art can make various modifications to the above-described embodiments without departing from the principle of the invention and from the scope of the invention defined by the accompanying claims.

What is claimed is:

1. A message transmitting and receiving apparatus comprising:
   a memory, storing keywords associated with said apparatus and degrees of importance of said keywords, the keywords being stored in said memory and used only for a user of said message transmitting and receiving apparatus;
   a detector, detecting an occurrence of a transmitted or received message;
   an extractor, in response to the detection of the occurrence of said received message, extracting a keyword from said received message, wherein the keywords stored in said memory are used for indicating, to the user of said message transmitting and receiving apparatus, the occurrence of the received message from another apparatus containing the keyword stored in said memory;
   importance determiner unit, determining dynamically a degree of importance of said extracted keyword and updating said keywords and said degrees of importance in said memory, wherein the degree of importance of the keywords changes in accordance with time, said importance determiner unit raises the degree of importance of the keyword stored in said memory, in response to the detection of the occurrence of the transmitted message which has been prepared in said apparatus in response to the received message containing the keyword, and said importance determiner unit causes the degree of importance of the keyword to be lowered in accordance with time in the absence of the occurrence of the transmitted message, and said importance determiner unit does not raise the degree of importance of the keyword when the occurrence of the received message containing the keyword has been detected but the occurrence of the transmitted message which has been prepared in said apparatus in response to the received message containing the keyword has not been detected; and
   an indicator, providing an indication of the occurrence of said extracted keyword within said received message in accordance with the determined degree of importance of said extracted keyword.

2. The apparatus according to claim 1, wherein said indicator providing the indication provides at least one of visual and audio indications of the occurrence of said extracted keyword in a manner determined by a degree of importance of said extracted keyword.

3. The apparatus according to claim 1 wherein said extractor further stores a new keyword extracted from the received message in said memory together with the degree of importance of said new keyword.

4. The apparatus according to claim 1 wherein said extractor extracts also a candidate keyword from the received message, and said apparatus further comprises a register, storing in said memory, the candidate keyword as a keyword, together with the degree of importance of the candidate keyword, when the user of the apparatus responds to received message data containing the candidate keyword within a predetermined range.

5. The apparatus according to claim 4 wherein said predetermined range is a predetermined number of messages.

6. The apparatus according to claim 4 wherein said predetermined range is a predetermined number of lines.

7. The apparatus according to claim 4 wherein said predetermined range is a predetermined number of words.

8. The apparatus according to claim 4 wherein said predetermined range is a predetermined number of characters.

9. The apparatus according to claim 4 wherein said predetermined range is a predetermined time period.

10. The apparatus according to claim 4 wherein said message data within the predetermined range is messages received consecutively from a same client.

11. The apparatus according to claim 1 wherein said importance determiner unit determines the degree of importance of a keyword stored in said memory, depending on whether the user of the apparatus has responded to the received message containing said keyword within a predetermined range.

12. The apparatus according to claim 11 wherein said predetermined range is a predetermined number of messages.

13. The apparatus according to claim 11 wherein said predetermined range is a predetermined number of lines.

14. The apparatus according to claim 11 wherein said predetermined range is a predetermined number of words.

15. The apparatus according to claim 11 wherein said predetermined range is a predetermined number of characters.

16. The apparatus according to claim 11 wherein said predetermined range is a predetermined time period.

17. The apparatus according to claim 11 wherein said message data within the predetermined range is messages received consecutively from a same client.

18. The apparatus according to claim 1 wherein said importance determiner unit changes the degree of importance of the keyword for a predetermined time period after the occurrence of the transmitted message from the user of the apparatus.

19. The apparatus according to claim 1 wherein said importance determiner unit lowers the degree of importance of the keyword for a predetermined time period after the occurrence of the transmitted message from the user of the apparatus.

20. The apparatus according to claim 1 wherein said importance determiner unit changes the degree of importance of the keyword during a time period when the user of the apparatus is operating an input device of the apparatus and during a predetermined time period after the user stops operating the input device.

21. The apparatus according to claim 1 wherein said importance determiner unit lowers the degree of importance of the keyword during a time period when the user of the apparatus is operating an input device of the apparatus and during a predetermined time period after the user stops operating the input device.

22. The apparatus according to claim 1 wherein said importance determiner unit determines the degree of importance of the keyword according to schedule data of the user of the apparatus.

23. The apparatus according to claim 1 wherein said importance determiner unit raises the degree of importance of the keyword according to schedule data of the user of the apparatus.

24. The apparatus according to claim 1 wherein said importance determiner unit sets, in accordance with a time period, the keyword and the degree of importance thereof designated by the user of said apparatus, the degree of importance of said keyword effective during said time period.

25. The apparatus according to claim 1 wherein said importance determiner unit determines the degree of importance of the keyword in accordance with the number of occurrences of the keyword in a predetermined range of received message data.

26. The apparatus according to claim 25 wherein said predetermined range is a predetermined number of messages.

27. The apparatus according to claim 25 wherein said predetermined range is a predetermined number of lines.

28. The apparatus according to claim 25 wherein said predetermined range is a predetermined number of words.

29. The apparatus according to claim 25 wherein said predetermined range is a predetermined number of characters.

30. The apparatus according to claim 25 wherein said predetermined range is a predetermined time period.

31. The apparatus according to claim 25 wherein said message data within the predetermined range is messages received consecutively from a same client.

32. The apparatus according to claim 1 wherein said importance determiner unit lowers the degree of importance of the keyword when the number of occurrences of the keyword in received message data within a predetermined time period exceeds a predetermined number.

33. The apparatus according to claim 1 wherein said importance determiner unit determines the degree of importance of the keyword in accordance with an attribute of the received message containing the keyword.

34. The apparatus according to claim 33 wherein the attribute of said received message is a network, a channel or a client.

35. A computer storage medium having a program stored thereon to transmit and receive messages, said program being for use in an information processing apparatus, said information processing apparatus including a processor and a memory, said program causing said processor to provide an indication of an occurrence of an extracted keyword by:

detecting an occurrence of a transmitted or received message;

extracting, in response to the detection of the occurrence of said received message, the keyword from said received message;

storing, in said memory, keywords associated with said apparatus and degrees of importance of said keywords, wherein the keywords are stored in said memory and used only for a user of said message transmitting and receiving apparatus, and the keywords stored in said memory are used for indicating, to the user of said message transmitting and receiving apparatus, the occurrence of the received message from another apparatus containing the keyword stored in said memory;

dynamically determining a degree of importance of said extracted keyword to update keywords associated with said apparatus and degrees of importance of the keywords stored in said memory, wherein the degree of importance of the keywords changes in accordance with time, the degree of importance of the keyword stored in said memory is raised in response to the occurrence of the transmitted message which has been prepared in said apparatus in response to the received message containing the keyword, the degree of importance of the keyword is lowered in accordance with time in the absence of the occurrence of the transmitted message, and the degree of importance of the keyword is not raised when the occurrence of the received message containing the keyword has been detected but the occurrence of the transmitted message which has been prepared in said apparatus in response to the received message containing the keyword has not been detected; and providing the indication of the occurrence of said extracted keyword within said received message in accordance with the determined degree of importance of said extracted keyword.

36. The program according to claim 35 wherein the providing the indication provides at least one of visual and audio indications of the occurrence of said extracted keyword in a manner determined by the degree of importance of said extracted keyword.

37. The program according to claim 35 wherein said extracting includes storing, in said memory, the new keyword extracted from the received message, together with the degree of importance thereof.

38. The program according to claim 35 wherein said extracting includes also extracting a candidate keyword from the received message, and said program further causes said processor to perform the storing, in said memory, the candidate keyword as the keyword, together with the degree of importance thereof, when the user of the apparatus has responded to received message data containing the candidate keyword within a predetermined range.

39. The program according to claim 38 wherein said predetermined range is a predetermined number of messages.

40. The program according to claim 38 wherein said predetermined range is a predetermined number of lines.

41. The program according to claim 38 wherein said predetermined range is a predetermined number of words.

42. The program according to claim 38 wherein said predetermined range is a predetermined number of characters.

43. The program according to claim 38 wherein said predetermined range is a predetermined time period.

44. The program according to claim 38 wherein said message data within the predetermined range is messages received consecutively from a same client.

45. The program according to claim 35 wherein said determining the degree of importance determines the degree of importance of the keyword stored in said memory, depending on whether the user of the apparatus has responded to the received message containing said keyword within a predetermined range.

46. The program according to claim 45 wherein said predetermined range is a predetermined number of messages.

47. The program according to claim 45 wherein said predetermined range is a predetermined number of lines.

48. The program according to claim 45 wherein said predetermined range is a predetermined number of words.

49. The program according to claim 45 wherein said predetermined range is a predetermined number of characters.

50. The program according to claim 45 wherein said predetermined range is a predetermined time period.

51. The program according to claim 45 wherein said message data within the predetermined range is messages received consecutively from a same client.

52. The program according to claim 35 wherein said determining the degree of importance includes changing the degree of importance of the keyword for a predetermined time period after the occurrence of the transmitted message from the user of the apparatus.

53. The program according to claim 35 wherein said determining the degree of importance includes lowering the degree of importance of the keyword for a predetermined time period after the occurrence of the transmitted message from the user of the apparatus.

54. The program according to claim 35 wherein said determining the degree of importance includes changing the degree of importance of the keyword during a time period when the user of the apparatus is operating an input device of the apparatus and during a predetermined time period after the user stops operating the input device.

55. The program according to claim 35 wherein said determining the degree of importance includes lowering the degree of importance of the keyword during a time period when the user of the apparatus is operating an input device of the apparatus and during a predetermined time period after the user stops operating the input device.

56. The program according to claim 35 wherein said determining the degree of importance includes determining the degree of importance of the keyword according to schedule data of the user of the apparatus.

57. The program according to claim 35 wherein said determining the degree of importance includes raising the degree of importance of the keyword according to schedule data of the user of the apparatus.

58. The program according to claim 35 wherein said determining the degree of importance includes setting, in accordance with a time period, the keyword and the degree of importance thereof designated by the user of said apparatus, the degree of importance of said keyword effective during said time period.

59. The program according to claim 35 wherein said determining the degree of importance includes determining the degree of importance of the keyword in accordance with the number of occurrences of the keyword in a predetermined range of received message data.

60. The program according to claim 59 wherein said predetermined range is a predetermined number of messages.

61. The program according to claim 59 wherein said predetermined range is a predetermined number of lines.

62. The program according to claim 59 wherein said predetermined range is a predetermined number of words.

63. The program according to claim 59 wherein said predetermined range is a predetermined number of characters.

64. The program according to claim 59 wherein said predetermined range is a predetermined time period.

65. The program according to claim 59 wherein said message data within the predetermined range is messages received consecutively from a same client.

66. The program according to claim 35 wherein said determining the degree of importance includes lowering the degree of importance of the keyword when the number of occurrences of the keyword in received message data within a predetermined time period exceeds a predetermined number.

67. The program according to claim 35 wherein said determining the degree of importance includes determining the degree of importance of the keyword In accordance with an attribute of the received message containing the keyword.

68. The program according to claim 35 wherein the attribute of said received message is a network, a channel or a client.

69. A method to process a keyword in a message transmitting and receiving apparatus, comprising:

detecting an occurrence of a transmitted or received message;

extracting, in response to the detection of the occurrence of said received message, the keyword from said received message;

storing, in said memory, keywords associated with said apparatus and degrees of importance of said keywords, wherein the keywords are stored in said memory and used only for a user of said message transmitting and receiving apparatus, and the keywords stored in said memory are used for indicating, to the user of said message transmitting and receiving apparatus, the occurrence of the received message from another apparatus containing the keyword stored in said memory;

dynamically determining a degree of importance of said extracted keyword to update keywords associated with said apparatus and degrees of importance of the keywords stored in the memory, wherein the degree of importance of the keywords changes in accordance with time, the degree of importance of the keyword stored in said memory is raised in response to the detection of the occurrence of the transmitted message which has been prepared in said apparatus in response to the received message containing the keyword, and the degree of importance of the keyword is lowered in accordance with time in the absence of the occurrence of the transmitted message, and the degree of importance of the keyword is not raised when the occurrence of the received message containing the keyword has been detected but the occurrence of the transmitted message which has been prepared in said apparatus in response to the received message containing the keyword has not been detected; and providing an indication of the occurrence of said extracted keyword within said received message in accordance with the determined degree of importance of said extracted keyword.

70. The method according to claim 69 wherein said determining the degree of importance includes setting, in accordance with a time period, the keyword and the degree of importance thereof designated by the user of said apparatus, the degree of importance of said keyword effective during said time period.

71. The method according to claim 69 wherein said determining the degree of importance includes determining the degree of importance of the keyword in accordance with an attribute of the received message containing the keyword.

72. A message transmitting and receiving apparatus comprising:

a message importance identifier, dynamically determining registered keywords and candidate keywords, assigning a degree of importance to each of the registered keywords and the candidate keywords, dynamically changing the degree of importance of the registered keywords and candidate keywords in accordance with time, the message importance identifier raising the degrees of importance of the keywords and candidate keywords stored in a memory, in response to the detection of an occurrence of a transmitted message which has been prepared in the apparatus in response to the received message containing the keyword, and the message importance identifier causes the degree of importance of the keyword to be lowered in accordance with time in the absence of the occurrence of the transmitted message, wherein said message importance identifier does not raise the degree of importance of the keyword when the occurrence of the received message containing the keyword has been detected but the occurrence of the transmitted message which has been prepared in said apparatus in response to the received message containing the keyword has not been detected; and a memory, storing registered keywords and candidate keywords associated with the apparatus and the degrees of importance of the registered keywords and candidate keywords, the keywords being stored in said memory and used only for a user of said message transmitting and receiving apparatus, wherein the keywords stored in said memory are used for indicating, to the user of said message transmitting and receiving apparatus, the occurrence of the received message from another apparatus containing the keyword stored in said memory, wherein the degree of importance of the keyword stored in said memory is raised in response to the detection of the occurrence of the keyword in the message, and the degree of importance of the keyword is lowered in the absence of the keyword in messages.

73. The apparatus of claim 72, wherein the message importance identifier comprises:

a detector, detecting the occurrence of the transmitted or received message;

an extractor, in response to the detection of the occurrence of the received message, extracting at least one of the registered keyword and the candidate keyword from said received message;

an importance determiner unit, determining dynamically a degree of importance of the extracted keyword and updating the keywords and the degrees of importance in the memory, wherein the degree of importance of the keywords changes in accordance with time; and an indicator, providing an indication of the occurrence of said extracted keyword within said received message in accordance with the determined degree of importance of said extracted keyword.

74. The apparatus according to claim 1, further comprising means for deleting the keyword having the degree of importance lower than a threshold value.

75. The program according to claim 35, further causing said processor to perform the deleting the keyword having the degree of importance lower than a given threshold value.

76. The apparatus according to claim 69, further comprising means for deleting the keyword having the degree of importance lower than a threshold value.

77. The program according to claim 72, further causing said processor to perform the deleting of the keyword having the degree of importance lower than a given threshold value.

* * * * *

UNITED STATES PATENT AND TRADEMARK OFFICE
CERTIFICATE OF CORRECTION

| | | |
|---|---|---|
| PATENT NO. | : 7,099,867 B2 | Page 1 of 1 |
| APPLICATION NO. | : 09/788388 | |
| DATED | : August 29, 2006 | |
| INVENTOR(S) | : Sumiyo Okada et al. | |

It is certified that error appears in the above-identified patent and that said Letters Patent is hereby corrected as shown below:

Column 18, Line 59, change "In" to --in--.

Signed and Sealed this

Seventeenth Day of April, 2007

JON W. DUDAS
*Director of the United States Patent and Trademark Office*